(12) United States Patent
Khazeni

(10) Patent No.: US 8,094,358 B2
(45) Date of Patent: Jan. 10, 2012

(54) DIMMING MIRROR

(75) Inventor: Kasra Khazeni, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/057,115

(22) Filed: Mar. 27, 2008

(65) Prior Publication Data

US 2009/0244679 A1    Oct. 1, 2009

(51) Int. Cl.
G02B 26/00    (2006.01)
(52) U.S. Cl. ........................................... 359/238
(58) Field of Classification Search .................. 359/238
See application file for complete search history.

(56) References Cited

U.S. PATENT DOCUMENTS

| | | |
|---|---|---|
| 4,441,791 A | 4/1984 | Hornbeck |
| 4,571,603 A | 2/1986 | Hornbeck et al. |
| 4,748,366 A | 5/1988 | Taylor |
| 4,859,060 A | 8/1989 | Katagiri et al. |
| 4,954,789 A | 9/1990 | Sampsell |
| 5,083,857 A | 1/1992 | Hornbeck |
| 5,216,537 A | 6/1993 | Hornbeck |
| 5,226,099 A | 7/1993 | Mignardi et al. |
| 5,489,952 A | 2/1996 | Gove et al. |
| 5,526,172 A | 6/1996 | Kanack |
| 5,530,240 A | 6/1996 | Larson et al. |
| 5,550,373 A | 8/1996 | Cole et al. |
| 5,551,293 A | 9/1996 | Boysel et al. |
| 5,629,521 A | 5/1997 | Lee et al. |
| 5,815,141 A | 9/1998 | Phares |
| 5,894,686 A | 4/1999 | Parker et al. |
| 5,977,945 A | 11/1999 | Ohshima |
| 6,014,121 A | 1/2000 | Aratani et al. |
| 6,040,937 A | 3/2000 | Miles |
| 6,295,048 B1 | 9/2001 | Ward et al. |
| 6,304,297 B1 | 10/2001 | Swan |
| 6,307,194 B1 | 10/2001 | Fitzgibbons et al. |
| 6,666,561 B1 | 12/2003 | Blakley |
| 6,674,562 B1 | 1/2004 | Miles et al. |
| 6,737,979 B1 | 5/2004 | Smith et al. |

(Continued)

FOREIGN PATENT DOCUMENTS

EP            0 649 010            4/1995

(Continued)

OTHER PUBLICATIONS

Mark W. Miles, "MEMS-based interferometric modulator for display applications," Proceedings of SPIE, vol. 3876, Aug. 1999, pp. 20-28.

(Continued)

*Primary Examiner* — Joseph P Martinez
(74) *Attorney, Agent, or Firm* — Knobbe Martens Olson & Bear LLP

(57) ABSTRACT

A dimming mirror comprises an array of interferometric light modulators is disclosed. In one embodiment of the invention, the dimming mirror comprises a plurality of interferometric light modulators and a control circuit adapted to configure the plurality of interferometric light modulators to at least one of a plurality of predefined states, including a first state having a substantially reflective appearance and a second state having a dimmed visual appearance as contrasted with the first state. Additional features may include additional states having an appearance with a dimmed visual appearance as contrasted with the first state and a reflective appearance as contrasted with the second state.

20 Claims, 5 Drawing Sheets

U.S. PATENT DOCUMENTS

| | | | |
|---|---|---|---|
| 6,819,469 | B1 | 11/2004 | Koba |
| 6,829,132 | B2 | 12/2004 | Martin et al. |
| 7,123,216 | B1 | 10/2006 | Miles |
| 7,138,984 | B1 | 11/2006 | Miles |
| 7,280,265 | B2 | 10/2007 | Miles |
| 7,327,510 | B2 | 2/2008 | Cummings et al. |
| 7,369,294 | B2 | 5/2008 | Gally et al. |
| 7,605,969 | B2 * | 10/2009 | Miles ............................ 359/290 |
| 7,688,494 | B2 * | 3/2010 | Xu et al. ........................ 359/245 |
| 7,733,552 | B2 * | 6/2010 | Londergan et al. ............ 359/237 |
| 2002/0075555 | A1 | 6/2002 | Miles |
| 2003/0112507 | A1 | 6/2003 | Divelbiss et al. |
| 2003/0117382 | A1 | 6/2003 | Pawlowski et al. |
| 2003/0128197 | A1 | 7/2003 | Turner et al. |
| 2004/0024580 | A1 | 2/2004 | Salmonsen et al. |
| 2005/0001797 | A1 | 1/2005 | Miller et al. |
| 2005/0002082 | A1 | 1/2005 | Miles |
| 2005/0068254 | A1 | 3/2005 | Booth |
| 2005/0122560 | A1 | 6/2005 | Sampsell et al. |
| 2006/0066503 | A1 | 3/2006 | Sampsell et al. |
| 2006/0066504 | A1 | 3/2006 | Sampsell et al. |
| 2006/0066595 | A1 | 3/2006 | Sampsell et al. |
| 2006/0066596 | A1 * | 3/2006 | Sampsell et al. .............. 345/204 |
| 2006/0066600 | A1 * | 3/2006 | Palmateer ..................... 345/204 |
| 2006/0066876 | A1 | 3/2006 | Kothari |
| 2006/0067028 | A1 | 3/2006 | Floyd |
| 2006/0077393 | A1 | 4/2006 | Gally et al. |
| 2006/0077521 | A1 * | 4/2006 | Gally et al. .................... 359/290 |
| 2006/0077617 | A1 | 4/2006 | Floyd |
| 2006/0176241 | A1 | 8/2006 | Sampsell |
| 2007/0023851 | A1 | 2/2007 | Hartzell et al. |
| 2007/0200839 | A1 | 8/2007 | Sampsell |
| 2007/0242008 | A1 | 10/2007 | Cummings |
| 2007/0247406 | A1 | 10/2007 | Zhou et al. |
| 2008/0112031 | A1 | 5/2008 | Gally et al. |
| 2009/0009847 | A1 | 1/2009 | Sasagawa et al. |
| 2009/0141286 | A1 | 6/2009 | Kothari |
| 2009/0207473 | A1 | 8/2009 | Bita et al. |
| 2009/0267869 | A1 | 10/2009 | Gally et al. |
| 2009/0267953 | A1 | 10/2009 | Sampsell et al. |
| 2009/0308452 | A1 | 12/2009 | Sasagawa et al. |
| 2010/0117761 | A1 | 5/2010 | Floyd |
| 2010/0149722 | A1 | 6/2010 | Floyd |
| 2010/0220248 | A1 | 9/2010 | Miles |
| 2011/0085278 | A1 | 4/2011 | Floyd |
| 2011/0115690 | A1 | 5/2011 | Cummings |
| 2011/0148828 | A1 | 6/2011 | Sampsell et al. |

FOREIGN PATENT DOCUMENTS

| | | |
|---|---|---|
| EP | 0 725 380 | 8/1996 |
| EP | 1 640 773 | 3/2006 |
| EP | 1 640 955 | 3/2006 |
| WO | WO 2004/066256 | 8/2004 |
| WO | WO 2005/066596 | 7/2005 |
| WO | WO 2006/036414 | 4/2006 |

OTHER PUBLICATIONS

ISR and WO dated Jun. 12, 2009 in PCT/US09/037562.

Miles, "A New Reflective FPD Technology Using Interferometric Modulation," Journal of the SID 5/4, 1997, pp. 379-382.

Miles et al., 10.1: Digital Paper™ for reflective displays, SID 02 Digest, pp. 115-117, 2002.

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Brank et al., Sep. 2001, RF MEMS-based tunable filters, International Journal of RF and Microwave Computer-Aided Engineering, 11(5):276-284.

IPRP dated Oct. 7, 2010 in PCT/US09/037562.

* cited by examiner

DIMMING MIRROR

BACKGROUND

Field

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs, transmits, and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

One aspect of the invention is a dimming mirror, comprising a plurality of interferometric light modulators and a control circuit adapted to configure the plurality of interferometric light modulators to at least one of a plurality of predefined states, including a first state having a substantially reflective appearance and a second state having a dimmed visual appearance as contrasted with the first state.

Another aspect of the invention is a method of using a dimming mirror, comprising receiving a signal indicative of one of a plurality of predefined states, including a first state having a substantially reflective appearance and a second state having a dimmed visual appearance as contrasted with the first state and setting a plurality of interferometric light modulators into the indicated state.

DETAILED DESCRIPTION OF THE PREFERRED EMBODIMENT

Typical usage of an interferometric light modulator involves taking advantage of the optical properties of the device. In some embodiments, the interferometric light modulator is a bistable device having two states, each with different optical properties. The state a particular modulator is in is controllable by the application of an appropriate electrical signal. Thus, the interferometric light modulator is well-suited for display applications. Interferometric modulators can be used in a variety of display applications, including motion (e.g., video) or stationary images (e.g., still image), and whether textual or pictorial. Interferometric modulators may be used in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry).

More simply, taking advantage of the bistable nature of a modulator, an array of interferometric modulators can take on a plurality of states, wherein each state represents a transition from fully reflective to a dimmed state. Such an array could find use, among other applications, as the rear-view mirror of a vehicle. Such a designed mirror could be dimmed to reduce glare from the headlights of other vehicles. The user of a dimming mirror comprising an array of interferometric modulators may set the array in one of a plurality of preconfigured states, wherein each state represents a transition from a reflective state to a dimmed state. It is also possible to equip the dimming mirror with a sensor, which would sense the amount of light impinging on the mirror and adjust the array of interferometric modulators accordingly.

Figure 1:
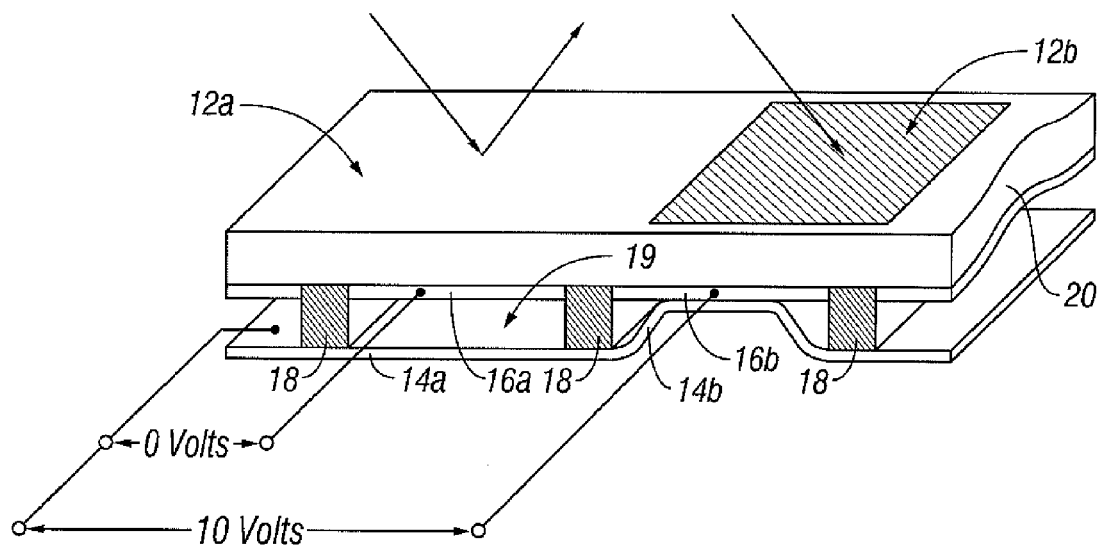
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

FIG. 1 is an isometric view depicting a portion of one embodiment of an interferometric modulator array in which a movable reflective layer of a first interferometric modulator is in a relaxed position and a movable reflective layer of a second interferometric modulator is in an actuated position. The depicted portion of the modulator array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by interferometric light modulator 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
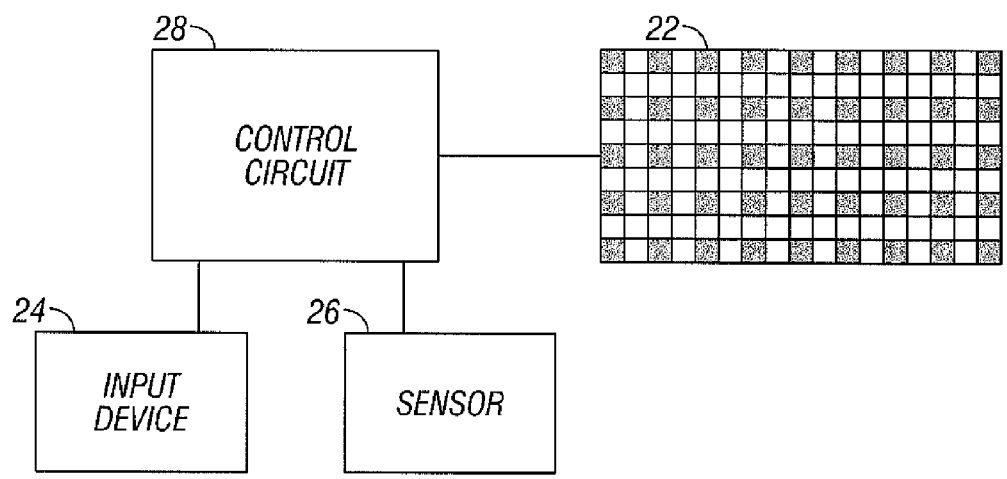
FIG. 2 is a system block diagram of a dimming mirror comprising an array of interferometric modulators.

FIG. 2 is a system block diagram of a dimming mirror comprising an array of interferometric modulators. In one embodiment of the invention, the dimming mirror comprises an array of interferometric modulators 22, an input device 24, a sensor 26, and a control circuit 28. In other embodiments, the dimming mirror comprises only one of an input device 24 and a sensor 26. It may be advantageous, in an embodiment with both an input device 24 and a sensor 26 to have a switch (either logical or physical) between the input device 24 and the sensor 26 to avoid conflicting signals being received at the control circuit. In an exemplary operation, the control circuit receives signals from either the input device 24 or sensor 26 causing the array of interferometric modulators to be in one of a plurality of preconfigured states. In some embodiments, the control circuit 28 will be responsible for determining which of the plurality of preconfigured states to cause the array of interferometric modulators 26 to be in based on a signal received from the sensor 26. The sensor may be configured, for example, to measure the brightness of light on the sensor.

Figure 3A:
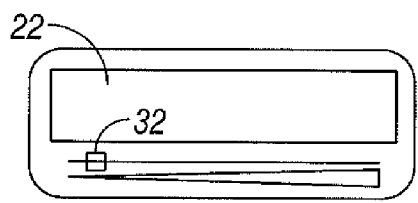
FIGS. 3A-3D illustrate exemplary embodiments of the invention using different input devices.
Figure 3B:
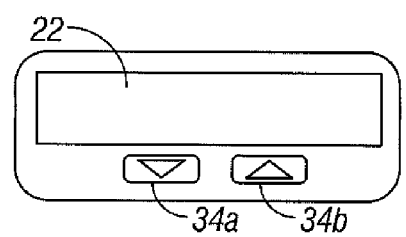
Figure 3C:
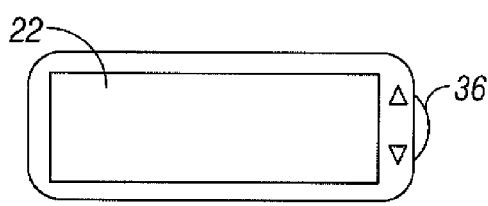
Figure 3D:
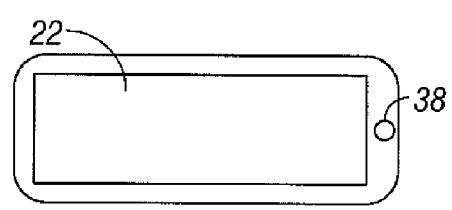

FIGS. 3A-3D illustrate exemplary embodiments of the invention using different input devices. In FIG. 3A, the input device is a slider 32. In some embodiments, the plurality of preconfigured states is ordered by a dimming value. By sliding the slider 32 to, e.g., the right, the array 22 would be placed in a preconfigured state with a smaller dimming value. By sliding the slider 32 in the opposite direction, the array of interferometric modulators 22 would take one of the preconfigured states with a greater dimming value. In FIG. 3B, the input device is a set of two buttons 34a, 34b. By pressing the brighten button 34b, the array 22 would take a preconfigured state with a lower dimming value. Similarly, by pressing the dim button 34a, the array 22 would take a preconfigured state with a higher dimming value. The dimming mirror of FIG. 3B may also be embodied with one button, which causes the array of interferometric modulators 22 to take either a darker or lighter state, and when the array 22 has reached its darkest or lightest state, another press of the button cycles back to the lightest or darkest state, respectively. The dimming mirror may also be equipped with a plurality of buttons, each button corresponding to one of the preconfigured states. In FIG. 3C, the input device is a dial 36 having much the same functionality as the slider. In FIG. 3D, the input device is replaced by a sensor 38. In this case, the sensor would detect the brightness of light on the sensor, and thus, the mirror, and adjust the dimming value of the array accordingly.

Figure 4A:
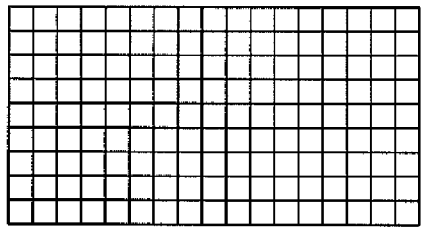
FIGS. 4A-4J illustrate examples of the plurality of states the array of interferometric modulators can be configured to take.
Figure 4F:
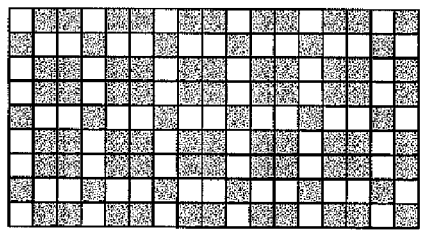
Figure 4B:
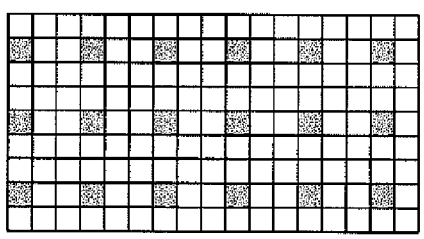
Figure 4G:
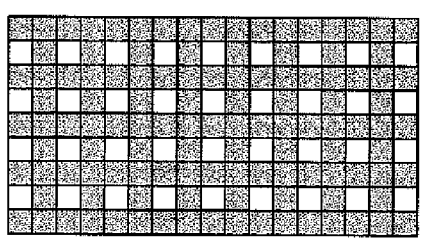
Figure 4C:
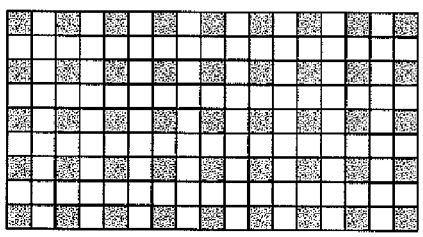
Figure 4H:
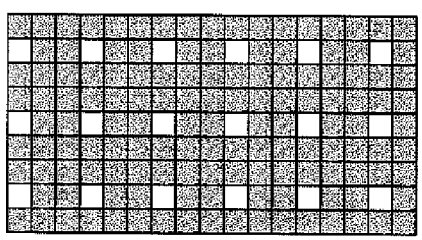
Figure 4D:
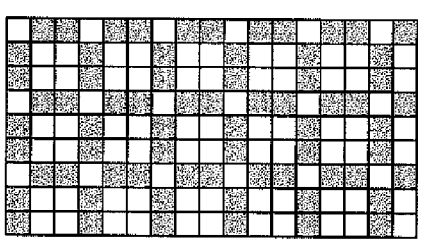
Figure 4I:
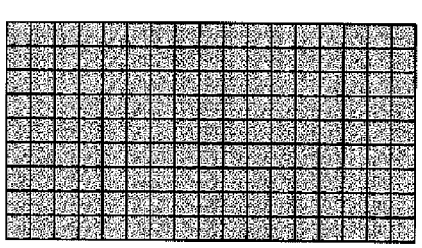
Figure 4E:
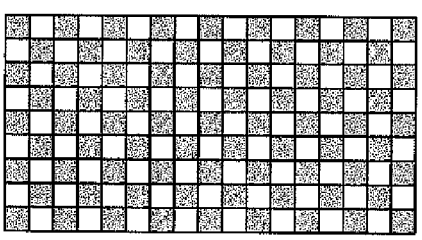
Figure 4J:
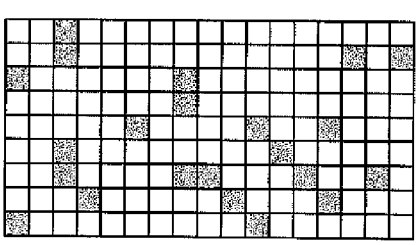

FIGS. 4A-4J illustrate examples of the plurality of states the array of interferometric modulators can be configured to take. In FIGS. 4A-4J, the white squares represent interference modulators in a reflective state, and the darkened squares represent interference modulators in a dimmed state. The array of interference modulators can be designed such that each modulator is reflective in the released state and dimmed in the actuated state. The array of interference modulators can also be designed where the opposite is true, such that each modulator is dimmed in the released state and reflective in the actuated state. Although FIGS. 4A-4J illustrate examples of the plurality of states the array of interferometric modulators can be configured to take, the invention does not require that each of these states are available, or preclude the use of other states. Also, FIGS. 4A-4J illustrate the use of a rectangular array of interference modulators, but this does not have to be the case. The array may be designed such that individual rows are offset from neighboring rows, or there may be a different number of modulators in each row. FIG. 4A illustrates a state in which all of the interferometric modulators are in a reflective state. FIG. 4B illustrates a state in which only 89% of the interferometric modulators are in a reflective state. Although this state shows the case where most of the dimmed modulators share a similar row or column with other dimmed modulators, this is not a necessary feature of this state, or of the invention. Each row may be advantageously offset to avoid negative optical effects, such as those associated with regular arrays. FIG. 4C illustrates a state in which only 75% of the interferometric modulators are in a reflective state. FIG. 4D illustrates a state in which only 55% of the interferometric modulators are in a reflective state. FIG. 4E illustrates a state in which only 50% of the interferometric modulators are in a reflective state. FIG. 4F illustrates a state in which only 45% of the interferometric modulators are in a reflective state. FIG. 4G illustrates a state in which only 25% of the interferometric modulators are in a reflective state. FIG. 4H illustrates a state in which only 11% of the interferometric modulators are in a reflective state. FIG. 4I illustrates a state in which none of the interferometric modulators are in a reflective state. FIGS. 4A-4I illustrate only a few of the multitude of options for the plurality of states which the array of interferometric modulators can take, and are meant in no way to be limiting. Although FIG. 4A-4I have shown regular patterns, irregular, or even random, patterns can be used as a state of the array of interferometric modulators as shown in FIG. 4J. Through the use of irregular, or even random, patterns such as the one shown in FIG. 4J it is possible that the plurality of states are not predetermined, but created randomly by the control circuit in response to a request to increase or decrease the dimming value of the state of the array of interference modulators.

Figure 5:
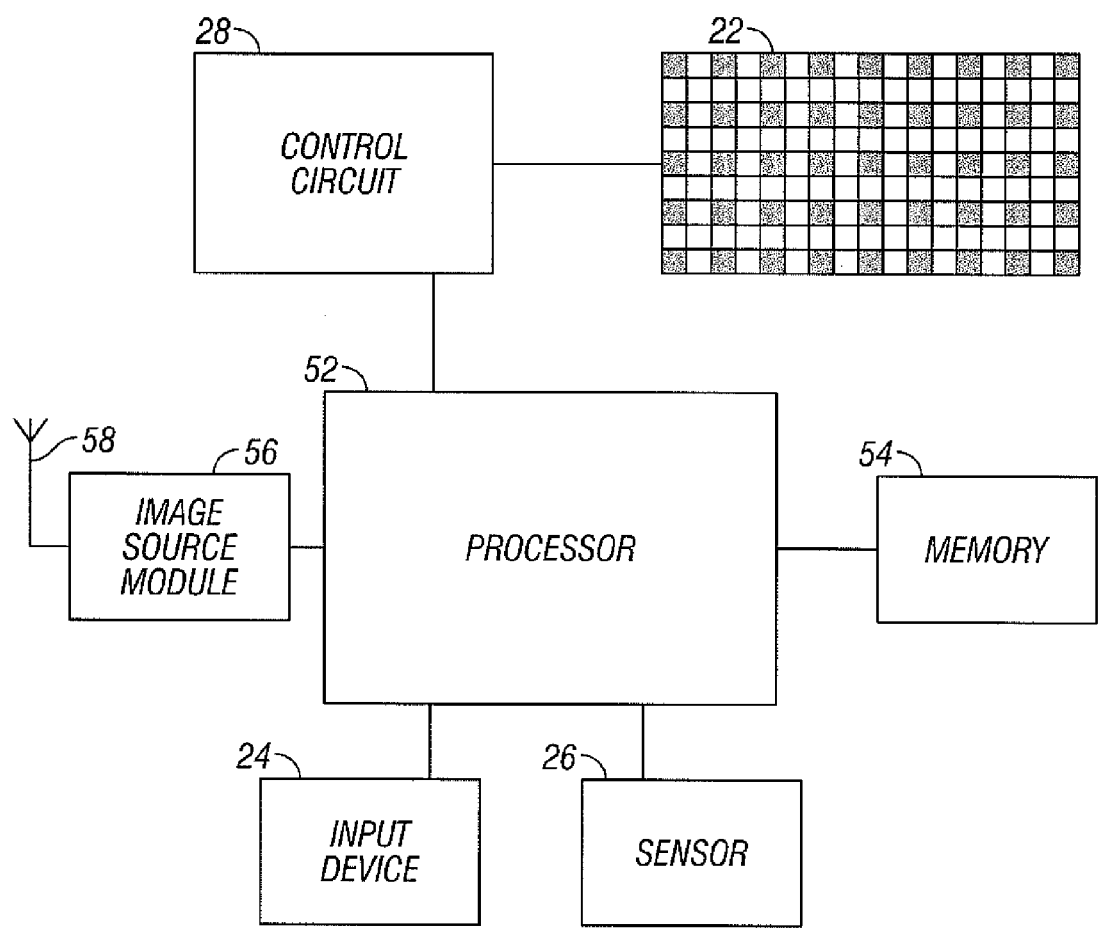
FIG. 5 is a system block diagram of another embodiment of the invention.
Figure 6A:
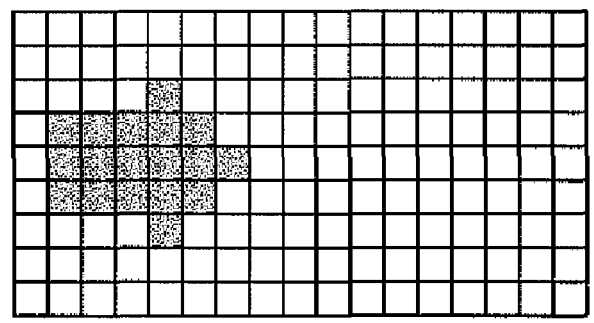
FIGS. 6A-6C show another use for the array of interferometric modulators within the dimming mirror to display information.
Figure 6B:
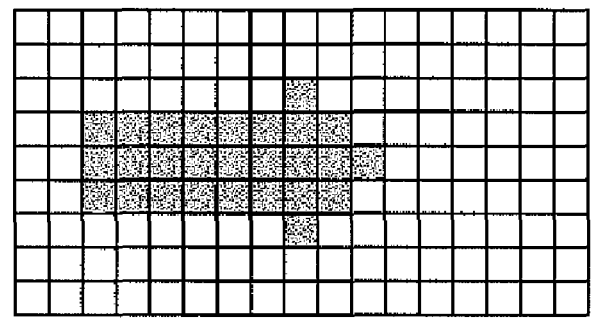
Figure 6C:
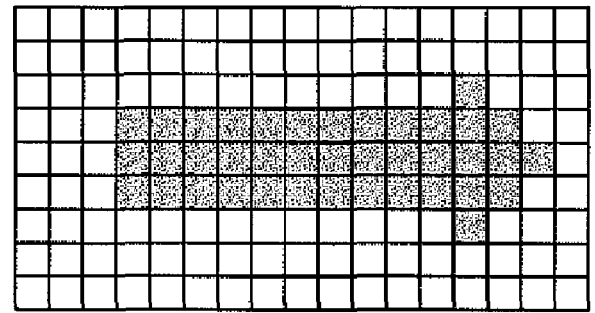

As the above described dimming mirror includes an array of interferometric light modulators, it may be possible to use the same array for other purposes, such as displaying images or information. FIG. 5 is a system block diagram of another embodiment of the invention. In this embodiment, the dimming mirror comprises an array of interferometric modulators 22, an input device 24, a sensor 26, a control circuit 28, a processor 52, a memory 54, an image source module 56, and a transceiver 58. The transceiver 58 can additionally serve as a transmitter or receiver. A variety of other uses of the array of interferometric modulators 22 can be achieved using this embodiment of the invention. For example, the array may be quickly alternated between the fully reflective and fully dimmed state as an indicator of an event, such as the need to check the engine, being low on fuel, or an incoming phone call. As another example, the right half of the dimming mirror may be quickly alternated between fully reflective and fully dimmed to indicate that the driver of a vehicle will need to soon turn right. FIGS. 6A-6C shows another use for the array of interferometric modulators within the dimming mirror. In this example, the array displays an arrow progressively moving to the right, to indicate, for example that the driver of a vehicle will need to soon turn right, or that the right turn indicator is active. The image source module 56 may receive new image information via the transceiver 58 for application on the array of interferometric modulators 22.

The foregoing description sets forth various preferred embodiments and other exemplary but non-limiting embodiments of the inventions disclosed herein. The description gives some details regarding combinations and modes of the disclosed inventions. Other variations, combinations, modifications, modes, and/or applications of the disclosed features and aspects of the embodiments are also within the scope of this disclosure, including those that become apparent to those of skill in the art upon reading this specification. Thus, the scope of the inventions claimed herein should be determined only by a fair reading of the claims that follow.

What is claimed is:

1. A dimming mirror, comprising:
   an array comprising a plurality of interferometric light modulators configured to reflect incident light so as to portray a reflected image; and
   a control circuit adapted to change a reflectance of one of more of the interferometric light modulators so as to configure the array to at least one of a plurality of states predefined with respect to the array, including a first state wherein the array portrays the reflected image with a first brightness and a second state wherein the array portrays the reflected image with a second brightness that is substantially less than the first brightness.

2. The dimming mirror of claim 1, wherein the plurality of predefined states further includes a third state wherein the array portrays the reflected image with a third brightness that is substantially less than the second brightness.

3. The dimming mirror of claim 1, further comprising an input device which allows a user to instruct the control circuit to set the array to one of the plurality of predefined states.

4. The dimming mirror of claim 3, wherein the input device is a slider, a dial, or at least one button.

5. The dimming mirror of claim 1, further comprising a sensor to detect the amount of light striking the mirror.

6. The dimming mirror of claim 5, wherein the control circuit is adapted to configure the plurality of interferometric light modulators into one of the plurality of predefined states based on the detected amount of light striking the mirror.

7. The dimming mirror of claim 1, wherein the predefined state of the array is changed to indicate information.

8. The dimming mirror of claim 7, wherein the predefined state of the array is repeatedly changed to indicate information.

9. The dimming mirror of claim 1, further comprising:
   a processor that is configured to communicate with the array, the processor being configured to process image data; and
   a memory device that is configured to communicate with said processor.

10. The dimming mirror of claim 9, further comprising an image source module configured to send said image data to said processor.

11. The dimming mirror of claim 10, wherein the image source module comprises at least one of a receiver, transceiver, and transmitter.

12. The dimming mirror of claim 9, further comprising an input device configured to receive input data and to communicate said input data to said processor.

13. The system of claim 1, wherein the first state is predefined as substantially all of the interferometric modulators of the array being in a reflective state and the second state is predefined as substantially all of the interferometric modulators of the array being in a non-reflective state.

14. The system of claim 1, wherein the first state is predefined as substantially all of the interferometric modulators of the array being in a reflective state and the second state is predefined as a checker-board pattern of interferometric modulators of the array being in a non-reflective state.

15. The system of claim 1, further comprising a memory configured to store a pattern associated with each of the plurality of predefined states.

16. A method of using a dimming mirror, comprising:
   receiving a signal indicative of one of a plurality of states predefined with respect to an array, including a first state wherein the array portrays a reflected image with a first brightness and a second state wherein the array portrays a reflected image with a second brightness that is substantially less than the first brightness; and
   changing a reflectance of one or more interferometric light modulators of the array so as to configure the array to the indicated state.

17. The method of claim 16, wherein the indicative signal indicates one of the plurality of predefined states with respect to a current predefined state of the array.

18. A dimming mirror, comprising:
   means for receiving a signal indicative of one of a plurality of states predefined with respect to an array, including a first state wherein the array portrays a reflected image with a first brightness and a second state wherein the array portrays the reflected image with a second brightness that is substantially less than the first brightness; and
   means for changing a reflectance of one or more interferometric light modulators of the array so as to configure the array to the indicated state.

19. The dimming mirror of claim 18, wherein the means for receiving or means for changing comprises a control circuit.

20. The dimming mirror of claim 18, wherein the means for receiving or means for changing comprises a processor.

* * * * *